Feb. 15, 1944.  R. MEREDITH  2,342,086
METHOD OF WELDING MAGNESIUM AND ALLOYS THEREOF
Filed Jan. 14, 1943
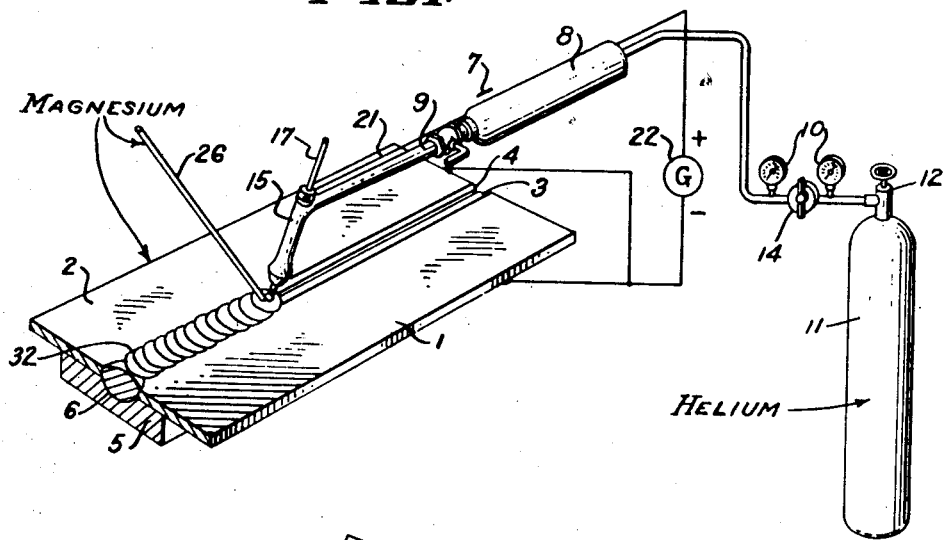
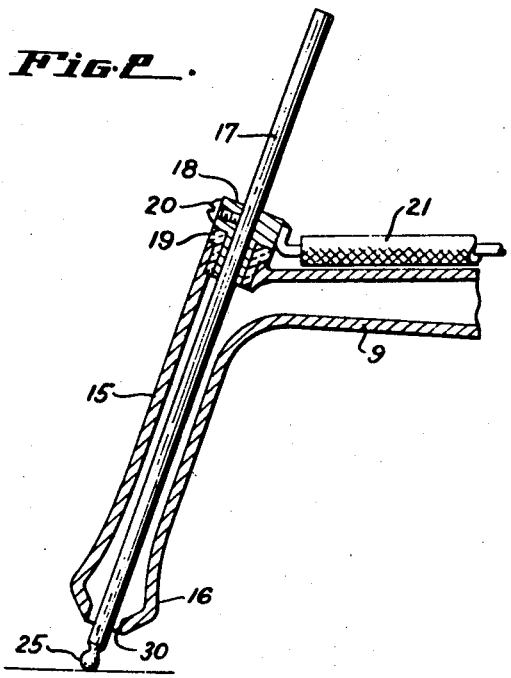
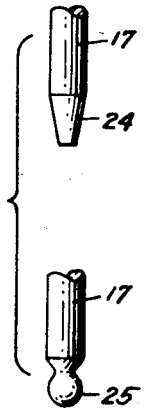
INVENTOR.
RUSSELL MEREDITH
BY
ATTORNEY Patented Feb. 15, 1944

2,342,086

UNITED STATES PATENT OFFICE 2,342,086

METHOD OF WELDING MAGNESIUM AND ALLOYS THEREOF

Russell Meredith, Los Angeles, Calif., assignor to Northrop Aircraft, Inc., a corporation of California Application January 14, 1943, Serial No. 472,391

14 Claims. (Cl. 219—10)

My invention relates to welding of magnesium and its alloys, and more particularly to a method whereby inflammable metals having a relatively low melting point may be efficiently welded by the electric arc.

This application is a continuation-in-part of my prior application Serial No. 413,711, filed October 6, 1941, which is in turn a continuation-in-part of my prior application Serial No. 373,157, filed January 4, 1941 now Patent No. 2,274,631, issued February 24, 1942, the disclosure of which by this reference is incorporated herein.

In modern airplane development, the trend is toward the use of light, strong alloys, and as a consequence magnesium, due to its lightness, is more and more coming into use for such purposes. In most cases when magnesium sheets, or sheets made of magnesium alloys containing a predominance of magnesium are used and the airplane or other light structures fabricated from these sheets, and from extruded elements of the same material, the structures have generally heretofore been fabricated by riveting. Obviously, a welding technique capable of welding highly inflammable materials, such as magnesium, must differ greatly from the techniques used in welding materials having high melting points and higher ignition temperatures. It is well known that magnesium metal will burn in practically all of the polytomic gases, such as for example, oxygen, carbon dioxide and nitrogen.

I have found, however, that when magnesium is blanketed with a covering of a monatomic inert gas, such as helium or argon, that ignition of the magnesium will not occur. I have also found that magnesium and various alloys thereof, such as for example, the various grades of "Dowmetal" rapidly lose their stiffness upon being heated at relatively low temperatures, and the scarfed edges become limp and sag to such an extent that ordinary welding methods are entirely unsatisfactory.

The primary object of my invention is to provide a method of welding magnesium without ignition thereof. Another object of my invention is the providing of a method for welding magnesium and its common alloys, in such a manner that a strong weld is made and wherein sagging and deformation of the metal adjacent the weld is controlled, without the application of corrosive welding fluxes commonly used for welding of light alloys generally and magnesium alloys in particular. I have also found that in the welding of magnesium the cast structure of the weld has approximately 50% of the strength of the original wrought metal, in pounds per square inch, and in consequence another object of my invention is to provide a method of making a magnesium weld wherein the weld section is increased approximately 100% in area so that the weld portion is approximately as strong as the adjacent material.

Broadly as to method, my invention comprises the striking of an electric arc between a tungsten rod and the magnesium pieces to be welded, in an atmosphere of helium or argon which is being supplied to the arc region under relatively low pressure. During the welding of magnesium pieces, I prefer to form the weld under the influence of gravity and prevent sagging, running and dripping by backing the weld in such a manner that the lower part of the weld is molded with an enlarged weld section, so that after the weld is completed, the weld area will have a larger section than that of the adjacent material. In some cases I may form the backing of magnesium itself, or I may back the pieces to be welded by a material having a higher melting point than the magnesium, so that the melted magnesium will not stick thereto, and so that the finished weld can be easily removed from the backing.

My invention may be more fully understood by direct reference to the drawing, wherein:

Fig. 1 is a partly diagrammatic perspective view of the general welding layout embodying my invention.

Fig. 2 is a view partly in section of the helium tungsten welding "torch" as it may be called, shown diagrammatically in Fig. 1, and Fig. 3 shows two views of the tungsten rod tip.

Referring directly to Fig. 1 for the general setup of my invention for a butt-weld, a pair of magnesium sheets I and 2 are held securely in a jig, not shown, and the edges of the sheets to be welded are provided with scarfs 3 and 4, the angle formed by these scarfs being on the order of 100°, this angle being varied somewhat in accordance with the thickness and specific chemical structure of the magnesium or alloy to be welded. The sharp lower edges of the scarfs 3 and 4 are closely adjacent, and the sheets I and 2 are preferably positioned in a horizontal plane so that gravity may act on the metal during the weld. Immediately beneath the scarfed edges 3 and 4 of the sheet is positioned a backing plate 5 usually of copper having a central semi-elliptical channel 6 therein, centered with respect to the alined edges of the scarfs. The backing plate 5 may well be an integral portion of the jig holding sheets I and 2. If desired, and for best results the chilling effect of the backing plates on the weld can be reduced by suitable heat transfer means, preferably electric, embedded in the backing plate 5. The welding torch 7 is provided comprising a handle 8 surrounding a copper tube 9 extending therethrough, one end of which connects to a pressure gauge system 10 of the usual type which is supplied with gas from a helium tank 11 controlled by shut-off valve 12. Helium tank 11 contains relatively pure helium under pressure, and the pressure is reduced by reducing valve 14 to a value in the neighborhood of about one-third pound per square inch pressure. The other end of pipe 9 connects with a hollow delivery nozzle 15 terminating in a flare 16. A tungsten welding rod 17 passes axially through nozzle 15, and is held in place by a copper bushing 18 attached to a heat resisting insulator 19, which is pressed into the top of nozzle 15. Rod 17 is adjustable in nozzle 15 by the use of rod set-screw 20. Copper bushing 18 is supplied with electrical current through one or more parallel connected supply wires 21, these wires passing through handle 8 and going to a direct current generator 22, the other pole of which is connected to sheets 1 and 2 and backing 6, by appropriate connectors. This connection may of course be made to the jig, but I have found it preferable to connect the generator directly to both sheets for best results.

The arc tip of rod 17 is shown in Fig. 3, this tip being originally ground to a coned end 24 before being used, and I have found that after the arc has been struck this coned end changes shape due to the heat of the arc, to a ball-end 25, and that this ball-end once formed, remains in good condition for a large amount of welding. After the ball-end 25 has been destroyed by repeated welds, the rod may be reconed by hand and reformed into a ball by welding. The metal for the weld is supplied by a magnesium alloy filler rod 26 without flux coating of any kind, and best results have been obtained by feeding this rod in on the side of the scarf as shown in Fig. 1.

For magnesium sheets from .040 to .1 inch, an open circuit generator voltage of from 40 to 60 volts may be used with amperage varying from 35 to 75 amperes in accordance with the demand required. Helium is then flowed at low pressure, say about one-third pound per square inch in the nozzle, through the pipe-line 9, so that it emerges from the open end 30 on nozzle 15, immediately around the tip 25 of tungsten rod 17.

The arc is then struck against the object to be welded, and the magnesium alloy filler rod is fed into the arc zone. The filler rod should be fed carefully so as to avoid touching the arc stream or the tungsten rod. The filler rod is preferably held in a position to be melted by the reflected heat only of the arc to avoid burning of the filler rod material. The arc should be moved to the bottom of the scarf, then to the top of the bead, as the metal from the filler rod is melted, so as to insure full fusion of the metal, and the arc should be maintained close to the puddle formed by the metal melting from the filler rod 26 and the melted sheet edges. The cold filler rod should never touch the molten metal and should not be used to form the puddle as this will cause a gas inclusion. The filler rod is merely used for feeding metal into the weld as needed. The puddle should be formed by movement of the tungsten tip 25, with the weld metal being flowed in from the side from the filler rod. Under these conditions tungsten does not deposit in the weld, but changes to tungsten oxide, and either disappears as a gas or deposits on the sheets 1 and 2 at a distance from the weld.

With this in mind, and with the sheets 1 and 2 set up as shown in Fig. 1, the weld is started. The helium gas surrounding the arc revents ignition of the sheets edges or of the filler rod and a puddle forms. Backing plate 5 controls sagging of the sheet edges on the sides of the weld, but allows sagging into channel 6, with channel 6 acting as a mold, so that on the back of the weld a semi-elliptical bead is formed as the weld is built up from a series of puddles 32. These puddles should be made sufficiently high above the surface of sheets 1 and 2 to allow for shrinkage. After the weld is finished the surface indications of the puddles 32 may be removed by grinding, if desired, to leave a smooth top surface 33. The weld section, due to the molding of the back of the weld may be made approximately 100% greater than the sheet section, and in consequence the loss of strength in the weld may be approximately compensated for. The use of the backing strip as a whole prevents any dripping, running or distortion other than the desired and controlled shaping of the weld and adjacent areas.

It will be obvious to those skilled in the art that other shapes may be welded as desired, utilizing the teachings outlined above by using scarfed edges, a backing member having a channel therein, so that the sagging material may be accurately molded as desired to form a strengthening bead. It is also obvious that welds can be made with flat backing plates if high strength is not necessary, or without backing plates of any nature, if sagging of the welding edges or the weld is not objectionable.

I would like to point out several features of my invention which, while not essential to the broad practice of the invention, are highly desirable in making perfect welds. It will be noticed that I have used a flared portion 16 at the end of the welding torch. This flared section is for a definite purpose as it prevents oxygen which is being drawn into the arc region by the action of the outflowing helium gas, from entering the weld and touching the heated metal. The outflowing gas from aperture 30 spreads around the arc with the flow outward over the sheets from the edges of apertures 30. Such an outward helium flow draws air downwardly along nozzle 15, and flare 16 on the nozzle directs this air flow away from the arc region. I have found that such a flare is highly desirable to prevent accidental oxygen entrance into the region of the weld.

I have found that with the use of the method and apparatus described above, that I can make a butt-weld between magnesium sheets of from .040 to .180 inch thickness, for example, at the rate of 10 to 15 inches per minute using 65 to 140 amperes. I have also found that melting of the tungsten rod can be accurately controlled by proportioning the diameter of the rod from approximately .130 of an inch for a 50 ampere current density, up to ¼ inch at a 200 ampere current density. By the use of helium gas surrounding the weld I have completely prevented any ignition or burning of the sheets, filler rod or deposited material, and the weld is free from gas intrusions, and from magnesium or tungsten oxide inclusions. The welding of highly inflammable magnesium is thus as satisfactory from a practical standpoint as the welding of other materials which do not have the low sagging, low ignition and low melting temperature of magnesium.

I claim:

1. The method of welding magnesium or the like which comprises scarfing adjacent parts to be welded, starting an electric arc between a movable tungsten electrode and the adjacent scarfed portions, feeding filler metal into the arc zone apart from the arc stream, and surrounding said arc with a flowing stream of helium gas during movement of said electrode.

2. In a method of arc-welding magnesium and magnesium-base alloys, the steps which comprise maintaining an electric arc between the work and a metallic tungsten electrode, supplying filler rod of composition substantially identical with that of the work to the arc zone, and blanketing molten portions of the work during welding with an atmosphere of helium.

3. The method of arc-welding magnesium or the like metal having similarly low temperatures of sagging, ignition, and melting, which comprises maintaining an electric arc between the adjacent edges of the metal parts to be welded and an electrode formed of tungsten or the like refractory metal conductive but substantially infusible at the arc temperature, and surrounding said arc and the molten weld metal with a flowing stream of at least one noble monatomic gas chemically inert in the presence of such molten metal and selected from the group consisting of helium and argon.

4. The method of arc-welding magnesium or the like metal having similarly low temperatures of sagging, ignition, and melting, which comprises scarfing at least one of the adjacent edges of the metal parts to be welded, maintaining an electric arc between said at least one scarfed edge and an electrode formed of tungsten or the like refractory metal conductive but substantially infusible at the arc temperature, feeding filler metal into the arc zone apart from the arc stream to melt and deposit such filler metal at said edges, and surrounding said arc and such molten metal with a flowing stream of at least one noble monatomic gas chemically inert in the presence of such molten metal and selected from the group consisting of helium and argon.

5. The method of arc-welding magnesium or the like metal having similarly low temperatures of sagging, ignition, and melting, which comprises maintaining an electric arc between the adjacent edges of the metal parts to be welded and an electrode formed of tungsten or the like refractory metal conductive but substantially infusible at the arc temperature, feeding filler metal into the arc zone apart from the arc stream to melt and deposit such filler metal at said edges, and surrounding said arc and such molten metal with a flowing stream of a noble monatomic gas chemically inert in the presence of such molten metal and selected from the group consisting of helium and argon.

6. In a method of arc-welding magnesium and magnesium-base alloys, the steps which comprise maintaining an electric arc between the work and a metallic tungsten electrode, and blanketing molten portions of the work during welding with an atmosphere of helium.

7. In a method of arc-welding magnesium and magnesium-base alloys, the steps which comprise maintaining a direct current electric arc between the work as negative electrode and a metallic tungsten rod as positive electrode, and directing a stream of helium so as to envelop the arc and blanket molten portions of the work during welding.

8. In a method of arc-welding magnesium and magnesium-base alloys, the steps which comprise maintaining a direct current electric arc between the work as negative electrode and a metallic tungsten rod as positive electrode, and directing a stream of helium coaxially with the tungsten electrode so as to surround the arc and to spread over the surface of the molten weld metal as a protective blanket.

9. In a method of arc-welding magnesium and magnesium-base alloys, the steps which comprise maintaining an electric arc between the work and a metallic tungsten electrode, and blanketing molten portions of the work during welding with an atmosphere of at least one noble monatomic gas chemically inert in the presence of such molten metal and selected from the group consisting of helium and argon.

10. The method of welding magnesium or the like which comprises scarfing adjacent parts to be welded, starting an electric arc between a movable tungsten electrode and the adjacent scarfed portions, feeding filler metal into the arc zone apart from the arc stream, and surrounding said arc with a flowing stream of argon gas during movement of said electrode.

11. In a method of arc-welding magnesium and magnesium-base alloys, the steps which comprise maintaining an electric arc between the work and a metallic tungsten electrode, supplying filler rod of composition substantially identical with that of the work to the arc zone, and blanketing molten portions of the work during welding with an atmosphere of argon.

12. In a method of arc-welding magnesium and magnesium-base alloys, the steps which comprise maintaining an electric arc between the work and a metallic tungsten electrode, and blanketing molten portions of the work during welding with an atmosphere of argon.

13. In a method of arc-welding magnesium and magnesium-base alloys, the steps which comprise maintaining a direct current electric arc between the work as negative electrode and a metallic tungsten rod as positive electrode, and directing a stream of argon so as to envelop the arc and blanket molten portions of the work during welding.

14. In a method of arc-welding magnesium and magnesium-base alloys, the steps which comprise maintaining a direct current electric arc between the work as negative electrode and a metallic tungsten rod as positive electrode, and directing a stream of argon coaxially with the tungsten electrode so as to surround the arc and to spread over the surface of the molten weld metal as a protective blanket.

RUSSELL MEREDITH.